United States Patent
Nam

(10) Patent No.: US 7,356,339 B2
(45) Date of Patent: Apr. 8, 2008

(54) METHOD AND APPARATUS FOR ALLOCATING AN UNICAST ACCESS TERMINAL IDENTIFIER ACCORDING TO AN ACCESS TERMINAL'S MOVEMENT TO SUBNET IN A HIGH-SPEED DATA DEDICATED SYSTEM

(75) Inventor: Kang-Hyun Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 482 days.

(21) Appl. No.: 11/000,152

(22) Filed: Dec. 1, 2004

(65) Prior Publication Data

US 2005/0207368 A1 Sep. 22, 2005

(30) Foreign Application Priority Data

Mar. 16, 2004 (KR) ...................... 10-2004-0017684

(51) Int. Cl.
*H04Q 7/20* (2006.01)
(52) U.S. Cl. ...................... 455/436; 455/442; 370/331
(58) Field of Classification Search ............. 455/432.1, 455/436–444; 370/331–333
See application file for complete search history.

(56) References Cited

U.S. PATENT DOCUMENTS

| 7,103,662 B2 * | 9/2006 | Ray et al. .................... 709/225 |
| 2002/0193110 A1 * | 12/2002 | Julka et al. .................. 455/432 |
| 2003/0223427 A1 * | 12/2003 | Chang et al. ............. 370/395.3 |

* cited by examiner

*Primary Examiner*—Edward F. Urban
*Assistant Examiner*—Raymond S. Dean
(74) *Attorney, Agent, or Firm*—Roylance, Abrams, Berdo & Goodman, L.L.P.

(57) ABSTRACT

Disclosed is a method and apparatus for allocating a Unicast Access Terminal Identifier (UATI) to an access terminal (AT) from a source subnet to destination subnet in a 1×Evolution Data Only (1×EV-DO) system serving as a high-speed data dedicated system. The AT transmits a temporary-identifier allocation completion message to the destination subnet when the AT moves to the destination subnet while performing a temporary-identifier allocation procedure with the source subnet. Upon receiving the temporary-identifier allocation completion message, the destination subnet transmits a temporary-identifier allocation completion request message to the source subnet, which in response, transmits a temporary-identifier allocation completion response message to the destination subnet, which in response, allocates a new temporary identifier for the AT, and transmits a temporary-identifier allocation completion acknowledgement message to the AT.

19 Claims, 8 Drawing Sheets

UATI ALLOCATE REQUEST

| FIELD | TYPE |
|---|---|
| MESSAGE TYPE | M (MANDATORY) |
| MESSAGE LENGTH | M |
| TID | M |
| OLD UATI | M |
| AUTHENTICATION PARAMETER | M |
| PAGING PARAMETER | O (OPTIONAL) |
| LOCATION REGISTRATION | M |
| HW ID | O |

FIG.3

UATI ALLOCATE RESPONSE

| FIELD | TYPE |
|---|---|
| MESSAGE TYPE | M |
| MESSAGE LENGTH | M |
| TID | M |
| RET | M |
| UATI | O |
| PDSN IP ADDRESS | O |
| ACCESS NETWORK ADDRESS | O |

FIG.4

UATI COMPLETE REQUEST

| FIELD | TYPE |
|---|---|
| MESSAGE TYPE | M |
| MESSAGE LENGTH | M |
| TID | M |
| UATI | M |
| LOCATION REGISTRATION | M |

FIG.5

UATI COMPLETE RESPONSE

| FIELD | TYPE |
|---|---|
| MESSAGE TYPE | M |
| MESSAGE LENGTH | M |
| TID | M |
| RET | M |
| MN ID | O |
| PAGING PARAMETER | O |
| OLD UATI | O |
| HW ID | O |

FIG.6

METHOD AND APPARATUS FOR ALLOCATING AN UNICAST ACCESS TERMINAL IDENTIFIER ACCORDING TO AN ACCESS TERMINAL'S MOVEMENT TO SUBNET IN A HIGH-SPEED DATA DEDICATED SYSTEM

PRIORITY

This application claims the benefit under 35 U.S.C. § 119(a) of an application entitled "METHOD AND APPARATUS FOR ALLOCATING UNICAST ACCESS TERMINAL IDENTIFIER ACCORDING TO ACCESS TERMINAL'S MOVEMENT TO SUBNET IN HIGH-SPEED DATA DEDICATED SYSTEM", filed in the Korean Intellectual Property Office on Mar. 16, 2004 and assigned Serial No. 2004-17684, the entire contents of which are incorporated herein by reference.

BACKGROUND OF THE INVENTION

1. Field of the Invention

The present invention relates to a high-speed data dedicated system. More particularly, the present invention relates to a method and apparatus for allocating a Unicast Access Terminal Identifier (UATI) to an Access Terminal) in a 1× Evolution Data Only (1× EV-DO) system.

2. Description of the Related Art

A code division multiple access (CDMA) technique is a spread spectrum communication technique capable of supporting more users with limited frequency resources. CDMA communication systems which are mainly based on voice communication have developed from International Standard (IS)-95A and 95B supporting a relative low-speed data transmission rate of a maximum of 64 Kbps to IS-95C supporting a data transmission rate of 144 Kbps. IS-95C is referred to as "CDMA2000 1×", and supports streaming type multimedia services such as a set of services provided through wireless multimedia platforms such as Java, Brew, audio on demand, video on demand, and so on as well as a text service.

A CDMA2000 1× EV-DO system based on the CDMA 1× system supports a data transmission rate of a maximum of 2.4 Mbps that is 16 times as high as the data transmission rate supported by the CDMA2000 1× system, supports bi-directional data transmission as well as a high-speed Internet search during mobile communication, and simultaneously provides more users with high-speed data services at low cost because the capacity of the CDMA2000 1× EV-DO system is nearly 5 times the capacity of the CDMA2000 1× system. In the CDMA2000 1× EV-DO system, EV refers to the evolution of the CDMA2000 1×, and DO refers to the support of data only rather than voice. The 1× EV-DO standard is referred to as IS-856.

The 1× EV-DO granted by the International Telecommunication Union (ITU) can provide sufficient multimedia content in various fields such as wireless Internet access, real-time traffic information, wireless live broadcasts, television, movies, music videos, Internet games, mobile commerce (m-commerce), and so on using an improved data transmission rate and capacity. The 1× EV-DO system uses a CDMA2000 system base, and can be implemented by replacing an access network transceiver system. An access network transceiver system uses the structure of a wireless Internet protocol (IP) for directly accessing a packet network and does not use a circuit-switched mobile switching center (MSC). Thus, a packet data service can be maximized.

In order to distinguish among Access Terminals (ATs), other systems such as the CDMA2000 1× system, and so on use permanently assigned Mobile IDentifiers (MIDs) such as an International Mobile Subscriber Identifier (IMSI), an Electronic Serial Number (ESN), a Mobile Identification Number (MIN), and so on. In contrast, the 1× EV-DO system uses a Unicast Access Terminal Identifier (UATI) serving as a temporary identifier allocated in a unit of a subnet corresponding to a predetermined geographical region.

An AT seeking access to the 1× EV-DO system receives a UATI allocated from the system after setting up a radio traffic channel with a base station. The system allows Internet access to be enabled through an IP address allocation procedure, a user authentication procedure, and the like after an authentication operation is performed for the AT with the UATI. However, when the AT moves to a new subnet while the UATI is allocated to the AT, the system determines that the UATI allocation has failed because the conventional 1× EV-DO system processes the UATI allocation according to a limited individual subnet. Thus, there is a problem in that the UATI allocation fails when the AT moves to the new subnet when the UATI is allocated to the AT.

SUMMARY OF THE INVENTION

Therefore, the present invention has been made in view of the above problems, and it is one object of the present invention to provide a method and apparatus for allocating a Unicast Access Terminal Identifier (UATI) serving as a temporary identifier to an Access Terminal (AT) in a 1× Evolution Data Only (1× EV-DO) system for high-speed data transmission.

It is another object of the present invention to provide a method and apparatus that can continuously perform the UATI allocation operation even though the AT moves to a new subnet while a UATI is allocated to the AT in the 1× EV-DO system.

It is yet another object of the present invention to provide a method and apparatus that can continuously perform the UATI allocation operation by allowing a new subnet to use UATI allocation information of an old subnet even though the AT moves to the new subnet while a UATI is allocated to the AT in the 1× EV-DO system.

In accordance with one aspect of the present invention, the above and other objects can be accomplished by the provision of a method for allocating a temporary identifier to an access terminal (AT) moving from a source subnet to a destination subnet in a high-speed data dedicated system. The method comprises allowing the AT to transmit a temporary-identifier allocation completion message to the destination subnet when the AT moves to the destination subnet while performing a temporary-identifier allocation procedure with the source subnet;

transmitting a temporary-identifier allocation completion request message to the source subnet when the destination subnet receives the temporary-identifier allocation completion message from the AT;

transmitting a temporary-identifier allocation completion response message to the destination subnet in response to the temporary-identifier allocation completion request message via the source subnet; and allocating a new temporary identifier for the AT in response to the temporary-identifier allocation completion response message, and to transmit a temporary-identifier allocation completion acknowledgement message to the AT via the destination subnet.

In accordance with another aspect of the present invention, the above and other objects can be accomplished by the provision of an apparatus for allocating a temporary identifier to an access terminal (AT) in a high-speed data dedicated system. The system includes a plurality of subnets and provides ATs within the subnets with service using temporary identifiers. The apparatus comprises a source subnet for receiving a temporary-identifier allocation request message from the AT, allocating the temporary identifier having a subnet code of the source subnet, and transmitting a temporary-identifier allocation response message including the allocated temporary identifier to the AT; and a destination subnet for receiving a temporary-identifier allocation completion message from the AT, transmitting a temporary-identifier allocation completion request message to the source subnet, allocating a new temporary identifier for the AT when receiving a temporary-identifier allocation completion response message responding to the temporary-identifier allocation completion request message from the source subnet, and transmitting a temporary-identifier allocation completion acknowledgement message including the new temporary identifier to the AT.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a table illustrating fields comprising a UATI allocation request message "UATI Allocate Request" for transmission from an Access Network Controller (ANC) to a Data Location Register (DLR);

FIG. 4 is a table illustrating fields comprising a UATI allocation response message "UATI Allocate Response" for transmission from the DLR to the ANC in response to a UATI request of the ANC;

FIG. 5 is a table illustrating fields comprising a UATI allocation completion request message "UATI Complete Request" for transmission from the ANC to the DLR to indicate that a UATI has been appropriately allocated;

FIG. 6 is a table illustrating fields comprising a UATI allocation completion response message "UATI Complete Response" for transmission from the DLR to the ANC in response to the UATI allocation completion request message;

Throughout In the drawings, it should be noted that the same or similar elements are denoted by like reference numerals.

DETAILED DESCRIPTION OF THE PREFERRED EMBODIMENTS

Embodiments of the present invention will now be described in detail with reference to the accompanying drawings. In the following description, a detailed description of known functions and configurations incorporated herein will be omitted for conciseness. The words or expressions described herein are defined on the basis of functions associated with the present invention. It should be appreciated that the defined words or expressions can be changed according to intentions or usual practices of a user or operator.

Embodiments of the present invention to be described below are based on a procedure for completing a Unicast Access Terminal Identifier (UATI) allocation operation when an Access Terminal (AT) moves to another subnet while a UATI is assigned to the AT in a 1× Evolution Data Only (1× EV-DO) system.

Figure 1:
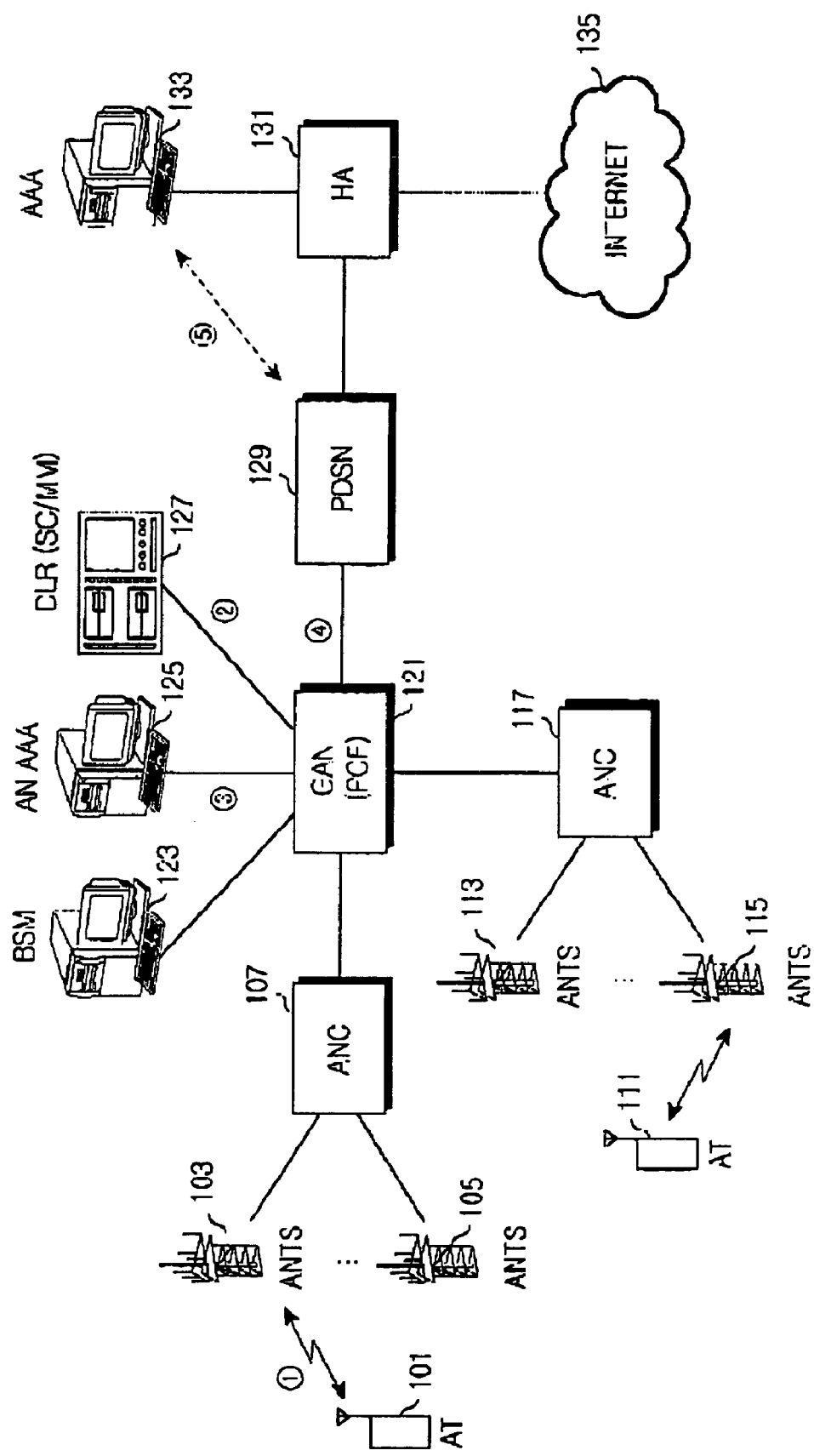
FIG. 1 is a diagram illustrating an architecture of a 1× Evolution Data Only (1× EV-DO) system for high-speed data transmission in accordance with an embodiment of the present invention.

FIG. 1 is a diagram illustrating an architecture of the 1× EV-DO system for high-speed data transmission in accordance with an embodiment of the present invention.

Referring to FIG. 1, the 1× EV-DO system includes ATs 101 and 111, Access Network Transceiver Systems (ANTSs) 103, 105, 113 and 115, Access Network Controllers (ANCs) 107 and 117, a General Asynchronous Transfer Mode (ATM) switch Network (GAN) 121, a Base Station Management (BAM) server 123, an Access Network-Authentication, Authorization and Accounting (AN-AAA) server 125, a Data Location Register (DLR) 127, a Packet Data Serving Node (PDSN) 129, a Home Agent (HA) 131, an Authentication, Authorization and Accounting (AAA) server 133, and an Internet network 135.

The ATs 101 and 111 may be terminal devices such as mobile phones, notebook computers, Personal Digital Assistants (PDAs), and the like capable of performing communication while users freely moving to various locations. The ATs 101 and 111 are present within service areas of the ANTSs 103, 105, 113 and 115. The ANTSs 103, 105, 113 and 115 are responsible for a wired or wireless conversion function to deliver signaling messages and data traffic from the ATs 101 and 111 to the GAN 121 via the ANCs 107 and 117, respectively. The ANCs 107 and 117 couple the ANTSs 103, 105, 113 and 115 to a 1× EV-DO network serving as the GAN 121, which is responsible for signal processing so that communication can be performed between the ANTSs 103, 105, 113 and 115 and the network.

The ANTSs 103, 105, 113 and 115 and the ANCs 107 and 117 form Access Networks (ANs). An air interface or radio interface is coupled between the ANCs 107 and 117 and the ATs 101 and 111, and an A13 interface (not shown) for performing a handoff is coupled between the ANs. Moreover, the ANs communicate with the AN-AAA server 125 via an A12 interface (not shown).

The GAN 121 functions as a gateway node for a connection to the 1× EV-DO network, and is responsible for a Packet Control Function (PCF) for intercommunication between the ANs and the 1× EV-DO network. An interface for signaling between the GAN 121 and the AN, is referred to as an A9 interface (not shown). An interface for data traffic is referred to as an A8 interface (not shown). The GAN 121 couples the AN to the DLR 127, the AN-AAA server 125, the PDSN 129, serve as nodes associated with a 1× EV-DO service. The GAN 121 communicates with the PDSN 129 via an A11 interface for signaling and an A10 interface for data traffic. As shown in FIG. 1, the DLR 127 covers a single GAN area in FIG. 1. However, the DLR 127 can also cover a plurality of GANs, and each GAN can be coupled to a plurality of DLRs.

The DLR 127 provides an Session Control/Mobility Management (SC/MM) function, and typically manages one subnet as a special physical node managed by a server referred to as a DLR Local Manager (DLM). The DLR divides the total subnet into a plurality of DLR Service Nodes (DSNs), for example, 8 DSNs, and manages the DSNs. The DLR 127 performs functions including processing messages according to the ANCs 107 and 117 and an A13 interface; processing protocol for communication between the ATs 101 and 111 and the ANTSs and for managing session information such as authentication keys, paging information, etc.; assigning UATIs to the ATs 101 and 111 coupled to the 1× EV-DO service; processing paging: keeping sessions alive; carrying out a subscriber message trace; storing permanent identifiers (including an IMSI, etc.); and transferring session information at handoff.

The AN-AAA server 125 manages a subscriber profile for the ATs, performs AT authentication, and is responsible for access request, acceptance, rejection, and so on.

The PDSN 129, a Home Agent 131 and the AAA server 133 are shared between the 1× EV-DO network and the CDMA2000 1× network, discriminate a 1× EV-DO service according to a service option or discriminate the CDMA2000 1× service and the 1× EV-DO service according to various options or destination IP addresses and port numbers, and perform a differentiated billing operation service by service.

A call processing procedure in the 1× EV-DO system constituted as shown in FIG. 1 is performed by performing traffic channel allocation to the ATs 101 and 111 (①); performing UATI address allocation by the DLR 127 (②); performing AT authentication through the AN-AAA server 125 (③); performing IP address allocation by the PDSN 129 or the HA 131 (④); and accessing the Internet network 135 after the AT authentication through the AAA server 133 (⑤).

Figure 2:
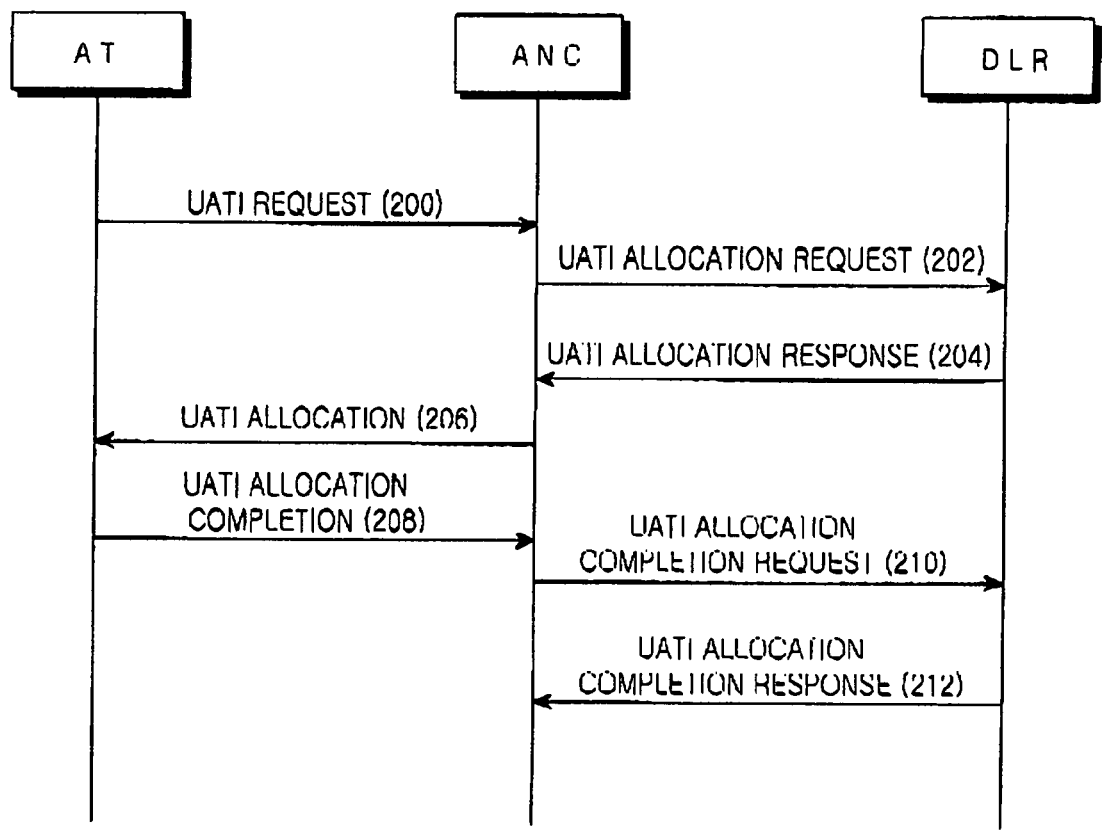
FIG. 2 is a message flow chart illustrating a Unicast Access Terminal Identifier (UATI) allocation procedure in the 1× EV-DO system in accordance with an embodiment of the present invention.

FIG. 2 is a message flow chart illustrating a Unicast Access Terminal Identifier (UATI) allocation procedure in the 1× EV-DO system in accordance with an embodiment of the present invention. When power is first in an ON state or a session is activated for the first time, the AT makes a new UATI allocation request using an arbitrarily allocated Random Access Terminal Identifier (RATI). Since, the ANTS responsible for an air interface between the AT and the ANC is not associated with the present invention, a description of the ANTS will be omitted.

Referring to FIG. 2, the AT transmits a UATI request message to the ANC using the RATI to make a UATI allocation request at step 200. The ANC creates a paging parameter for the UATI allocation request and transmits a UATI allocation request message including the paging parameter to the DLR at step 202. At this time, the DLR determines whether the AT making the UATI request will activate a new session in a new subnet covered by the DLR or has moved from a neighboring subnet to the new subnet. If the RATI has been used, it is determined that the AT making the UATI request has activated the new session.

The DLR stores the paging parameter, allocates the UATI for the AT, and transmits a UATI allocation response message including the allocated UATI to the ANC at step 204. The ANC transmits a UATI allocation message including the allocated UATI to the AT at step 206. The AT transmits, to the ANC, a UATI allocation completion message indicating that the new UATI has been confirmed at step 208. The ANC transmits a UATI allocation completion request message to the DLR at step 210. The DLR transmits a UATI allocation completion response message to the ANC and completes the UATI allocation procedure at step 212.

Types and formats of messages transmitted and received between the ANC and the DLR when the AT makes the UATI allocation request, will be described with reference to FIGS. 3 to 6.

FIG. 3 is a table illustrating fields comprising a UATI allocation request message "UATI Allocate Request" to be sent from an ANC to a DLR.

Referring to FIG. 3, the fields of the UATI allocation request message are classified into Mandatory (M) fields and O (Optional) fields. The M fields of the UATI allocation request message are a "Message Type" field indicating a message type, a "Message Length" field indicating message length, a "Transaction IDentifier (TID)" field for detecting the AT, and a "Location Registration" field comprising ANC_ID and ANTS_ID as a field when the AT's location is registered.

The O fields of the UATI allocation request message are an "Old UATI" field indicating a UATI previously allocated to the AT, an "Authentication Parameter" field comprising a "Security Layer Packet" field, a "Sector ID" field and "Time Stamp" field used for AT authentication, a "Paging Parameter" field comprising a maximum of 20 bytes used when paging, and a "Hardware Identification (HW ID)" field indicating hardware information.

FIG. 4 is a table illustrating fields comprising an UATI allocation response message "UATI Allocate Response" to be sent from the DLR to the ANC in response to a UATI request of the ANC.

Referring to FIG. 4, Mandatory (M) fields of the UATI allocation response message comprise a "Message Type" field indicating a message type, a "Message Length" field indicating message length, a "TID" field for detecting the AT, and a "RETurn (RET)" field indicating a service result. The "TID" field includes an AT identifier received through the UATI allocation request message shown in FIG. 3. Optional (O) fields of the UATI allocation response message comprise a "UATI" field including a UATI to be allocated to the AT, a "PDSN IP Address" field indicating a PDSN IP address, and an "Access Network Address" field indicating an AN address.

FIG. 5 is a table illustrating fields comprising an UATI allocation completion request message "UATI Complete Request" to be sent from the ANC to the DLR to indicate that a UATI has been appropriately allocated. As shown in FIG. 5, the UATI allocation completion request message includes a mandatory UATI field including the UATI to be allocated to the AT. Because the fields shown in FIG. 5 are similar to the fields shown in FIG. 4, a description of the fields shown in FIG. 5 will be omitted.

FIG. 6 is a table illustrating fields comprising an UATI allocation completion response message "UATI Complete Response" to be sent from the DLR to the ANC in response to the UATI allocation completion request message.

Referring to FIG. 6, a "RET" field includes information indicating a response to the UATI allocation completion request message. In detail, the "RET" field has the following values including:

a value indicating that the UATI allocation has been performed;

a value indicating that different UATIs having the same MN ID are present;

a value indicating that UATI resources to be allocated are insufficient;

a value indicating that a received UATI is different from an allocated UATI;

a value indicating that SHA-1 authentication defined by IS-856 has failed;

a value indicating that an MN ID corresponding to a received old UATI or session information is not present;

a value indicating that a transferred MN ID is different from a stored ID;

a value indicating that location information of an AT is unclear;

a value indicating that a message type cannot be recognized;

a value indicating that a mandatory parameter has been omitted;

a value indicating that a parameter incapable of being recognized has been received;

a value indicating that parameters are not useful;

a value indicating that protocol processing has failed;

a value indicating a limit of a Pre-Paid Service (PPS) subscriber; and a value indicating that failure processing associated with other cases has been performed.

Moreover, an "MN ID" field of the fields of the UATI allocation completion response message has a value indicating a format of an AT identifier, and includes an International Mobile Subscriber Identity (IMSI) as a single identifier, an Electronic Serial Number (ESN) allocated as fixed bits when the AT is manufactured, a Mobile Identification Number (MIN), a broadcast address used for broadcasting service, and so on.

Figure 7:
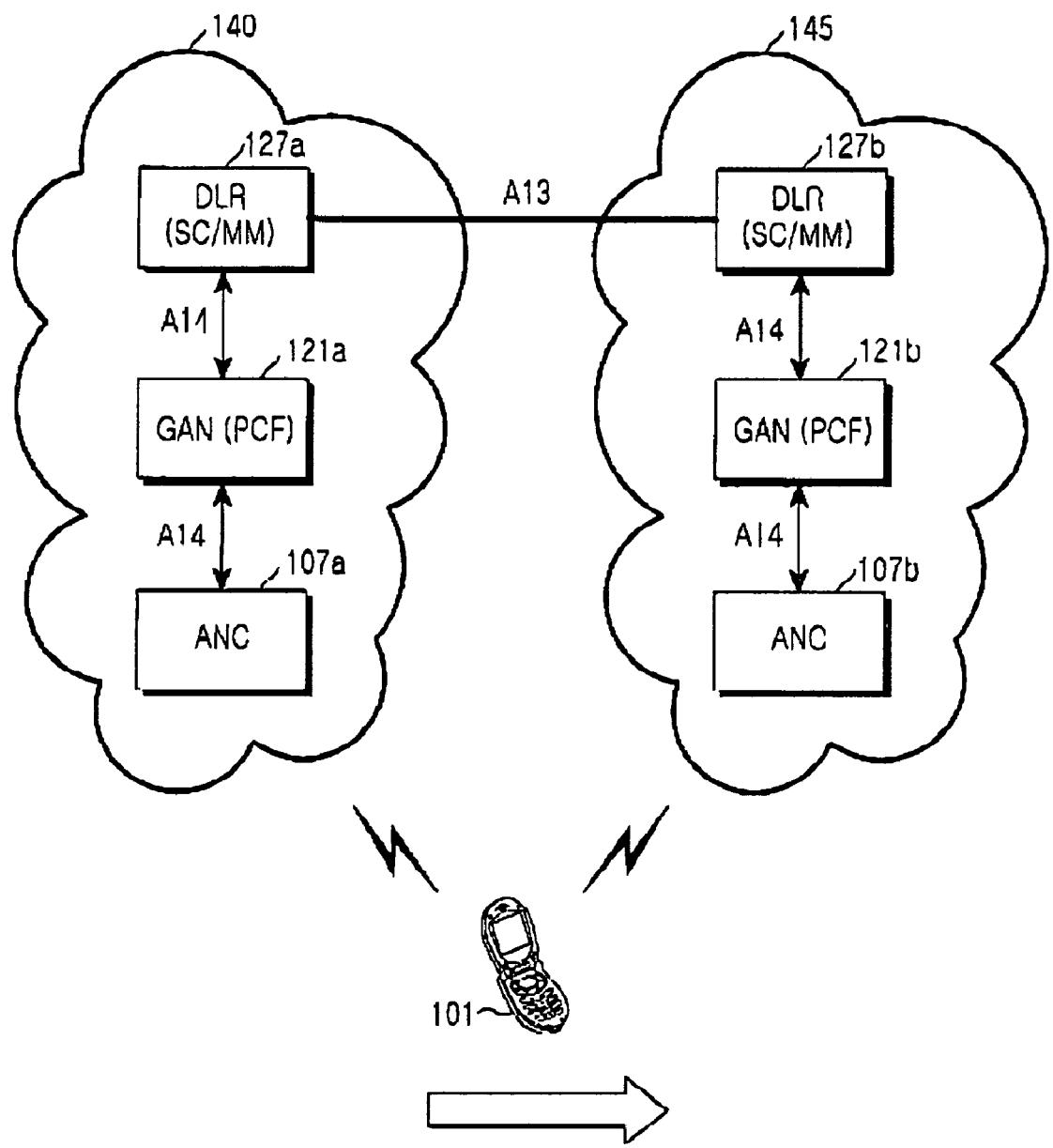
FIG. 7 is a block diagram illustrating an Access Terminal's (AT) movement between subnets in accordance with an embodiment of the present invention.

In the above-described UATI allocation procedure, the AT can move to a new subnet before UATI allocation is completed. FIG. 7 is a block diagram illustrating the AT's movement between subnets in accordance with an embodiment of the present invention.

Referring to FIG. 7, an AT 101 moves from a first subnet 140 covered by a first DLR 127*a* to a second subnet 145 covered by a second DLR 127*b*. The first subnet 140 includes a GAN 121*a* coupled to the first DLR 127*a* and an ANC 107*a*, and the second subnet 145 includes a GAN 121*b* coupled to the second DLR 127*b* and an ANC 107*b*. Here, the DLRs 127*a* and 127*b* perform intercommunication through an A13 interface. An A14 interface is used in each subnet.

When the AT 101 is in an idle or dormant state, the AT 101 compares the signal strength of a signal detected from the ANTS of the first subnet 140 with the signal strength of a signal detected from the ANTS of the second subnet 145. If the signal strength associated with the second subnet 145 is greater than that associated with the first subnet 140, the AT 101 synchronizes with the ANTS of the second subnet 145. At this point, the AT 101 confirms that a subnet has been changed, using subnet parameter information of overhead messages that is basic system information received from the ANTSs of the subnets 140 and 145.

Figure 8:
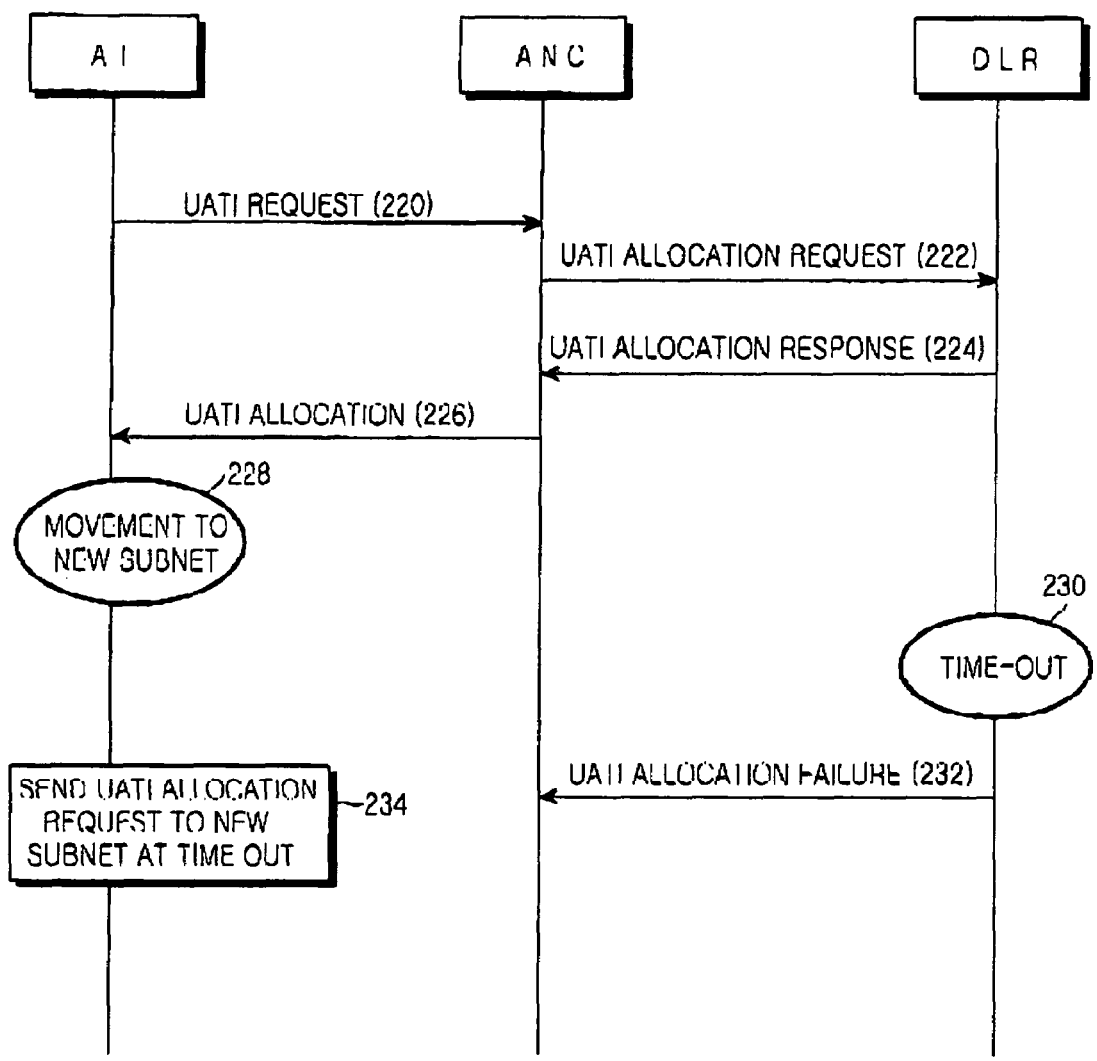
FIG. 8 is a message flow chart illustrating UATI allocation failure due to the AT's movement between the subnets.

FIG. 8 is a message flow chart illustrating UATI allocation failure due to the AT's movement between the subnets. Referring to FIG. 8, the AT transmits a UATI request message to the ANC to make a UATI request at step 220. The ANC transmits a UATI allocation request message to the DLR to make a UATI allocation request at step 222. The DLR allocates a UATI for the AT and transmits a UATI assignment response message including the allocated UATI to the ANC at step 224. The ANC transmits a UATI allocation message including the allocated UATI to the AT at step 226.

If the AT has not received the UATI allocation message at step 226 or has inappropriately moved to another subnet at step 228, a timer in the DLR is timed out in a state where the UATI allocation completion request message is not received, in the DLR at step 230. If so, the DLR transmits a UATI allocation failure message to the ANC at step 232.

The ANC receiving the UATI allocation failure message terminates the UATI allocation procedure without transmitting a response to the AT. Because UATI allocation has failed, the AT re-transmits a UATI allocation request to a new subnet. This UATI allocation request can be attempted up to a maximum of 10 times.

If the AT moves to another subnet while a UATI is allocated, a history based on messages exchanged between the ANC and DLR of the previous subnet is discarded, and the same procedure must be performed in a new subnet. The AT sends a UATI allocation request to the DLR after confirming a time out and exchanges messages relating to a UATI allocation response with the DLR at step 234. In order to prevent unnecessary messages from being exchanged, the DLR recognizing the fact that the AT has moved from a neighbor subnet requests that the DLR of the old subnet transmit information relating to UATI allocation and acquires the requested information in accordance with an embodiment of the present invention.

Figure 9:
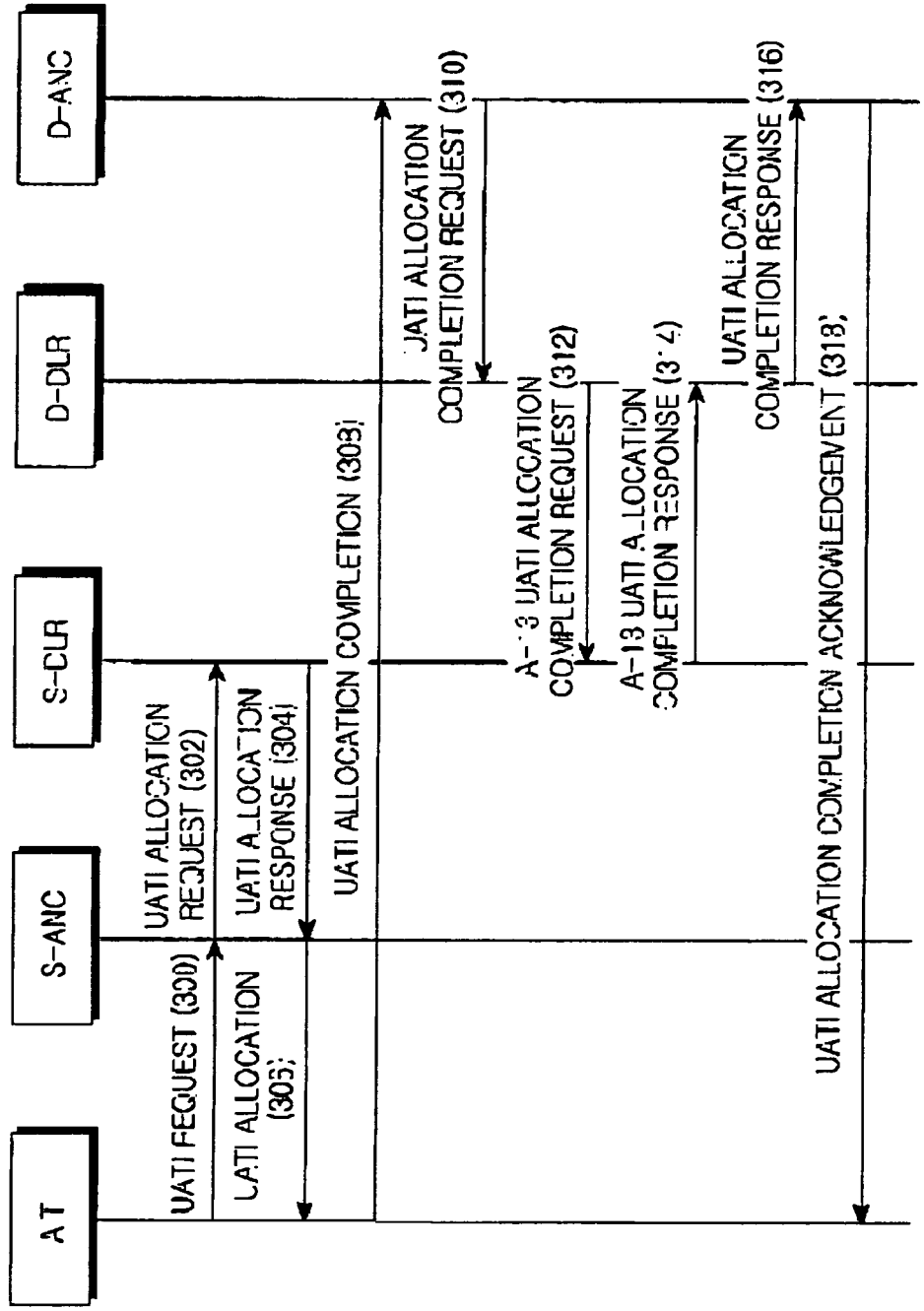
FIG. 9 is a message flow chart illustrating a UATI allocation procedure in accordance with an embodiment of the present invention.

FIG. 9 is a message flow chart illustrating a UATI allocation procedure in accordance with an embodiment of the present invention. Here, the AT moves from a source subnet to a destination subnet while a UATI is allocated. Moreover, a symbol "S-" is attached before names of components of the source subnet, and a symbol "D-" is attached before names of components of the destination subnet. As the AT moves between the subnets, a procedure for allowing the destination subnet to request that the source subnet transmit session and authentication information of the AT and to receive the requested information is performed. However, because the procedure is not directly associated with the present invention, a description of the procedure will be omitted.

Referring to FIG. 9, the AT transmits a UATI request message to the ANC (S-ANC) of the source subnet to make a UATI allocation request at step 300. The S-ANC transmits a UATI allocation request message to the DLR (S-DLR) of the source subnet to make the UATI allocation request at step 302. The S-DLR allocates a UATI for the AT, and transmits a UATI allocation response message including the allocated UATI to the ANC (S-ANC) of the source subnet at step 304. At this point, the S-DLR assigns a subnet code for detecting a subnet for the UATI allocation response message, and transfers the UATI. Alternatively, the allocated UATI can have the subnet code. At step 306, the S-ANC transmits a UATI allocation message including the allocated UATI to the AT.

Upon moving to the destination subnet in a state where no UATI is allocated to the AT, the AT confirms that a subnet has been changed, using subnet parameter information of an overhead message. At step 308, the AT transmits a UATI allocation completion message to the ANC (D-ANC) of the destination subnet corresponding to a new subnet. At step 310, the D-ANC transmits a UATI allocation completion request message to the DLR (D-DLR) of the destination subnet. Here, the UATI allocation completion message and the UATI allocation completion request message include the UATI received from the S-DLR, and the UATI has the subnet code.

Figure 10:
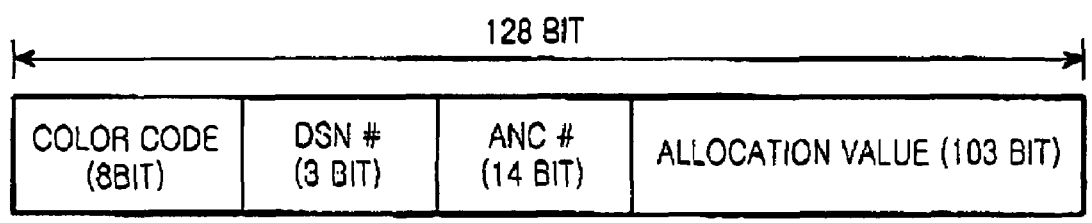
FIG. 10 shows a format of the UATI in accordance with an embodiment of the present invention.

The UATI is defined by 128 bits, but a 32-bit UATI may be used if the 128 bits occupy too much capacity when the bits are transmitted on an access and control channel of an air interface. An example of the 128-bit UATI is shown in FIG. 10. Referring to FIG. 10, the 128-bit UATI is configured by an 8-bit color code, a 3-bit DSN number, a 14-bit ANC number and a 103-bit allocation value. In accordance with an embodiment of the present invention, the color code is a subnet code indicating a corresponding subnet.

At step 312, the D-DLR interprets the UATI and confirms the subnet code. If the confirmed subnet does not match a subnet code of the D-DLR, the D-DLR transmits a UATI allocation completion request message including the UATI to the S-DLR. At this point, the UATI allocation completion request message is transmitted according to an A13 interface.

At step 314, the S-DLR deletes the UATI included in the UATI allocation completion request message from its own subscriber information database, and transmits a UATI allocation completion response message according to the A13 interface. At step 316, the D-DLR gives its own subnet code and allocates a new UATI when receiving the UATI allocation completion response message. Moreover, the D-DLR transmits a UATI allocation completion response message including the allocated new UATI to the D-ANC. At step 318, the D-ANC transmits a UATI allocation completion acknowledgement message including the allocated new UATI to the AT and completes the UATI allocation procedure.

As apparent from the above description, the embodiments of the present invention provide the following advantages.

Even though an access terminal (AT) moves to a new subnet before a Unicast Access Terminal Identifier being a temporary identifier is completely allocated in a state where a procedure for allocating the UATI is performed in order to access a 1× Evolution Data Only (1× EV-DO) system, the UATI allocation procedure can be stably completed without allowing the new subnet to repeatedly exchange unnecessary old messages. Therefore, unnecessary delay is removed when the UATI is allocated because the new subnet does not need to repeatedly exchange messages associated with an old subnet. While the AT moves between the subnets, the UATI allocation procedure can be stably performed.

Although the embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. A method for allocating a temporary identifier to an access terminal (AT) moving from a source subnet to a destination subnet in a high-speed data dedicated system, comprising the steps of:
    transmitting a temporary-identifier allocation completion message from the AT to the destination subnet when the AT moves to the destination subnet while performing a temporary-identifier allocation procedure with the source subnet;
    transmitting a temporary-identifier allocation completion request message to the source subnet when the destination subnet receives the temporary-identifier allocation completion message from the AT;
    transmitting a temporary-identifier allocation completion response message from the source subnet to the destination subnet in response to the temporary-identifier allocation completion request message; and
    allocating a new temporary identifier for the AT at the destination subnet in response to the temporary-identifier allocation completion response message, and transmitting a temporary-identifier allocation completion acknowledgement message to the AT.

2. The method according to claim 1, wherein the temporary identifier is a Unicast Access Terminal Identifier (UATI) for code division multiple access (CDMA)-2000 1×Evolution Data Only (1×EV-DO) service.

3. The method according to claim 1, further comprising the step of:
    deleting the temporary identifier allocated to the AT at the source subnet in response to the temporary-identifier allocation completion request message.

4. The method according to claim 1, wherein the AT recognizes that its own terminal has moved to the destination subnet by receiving an overhead message including subnet parameter information from an Access Network Transceiver System (ANTS) of the destination subnet and analyzing the received subnet parameter information.

5. The method according to claim 1, further comprising the step of:
    receiving a temporary-identifier allocation request message at the source subnet from the AT before the AT moves to the destination subnet, allocating the temporary identifier having a subnet code of the source subnet to the AT, and transmitting a temporary-identifier allocation response message including the allocated temporary identifier from the source subnet to the AT.

6. The method according to claim 1, wherein the destination subnet receives the temporary-identifier allocation completion message including the temporary identifier allocated by the source subnet from the AT, compares a subnet code included in the temporary identifier with its own subnet code, and recognizes the AT's movement.

7. The method according to claim 6, wherein the destination subnet detects the source subnet using the subnet code.

8. The method according to claim 1, wherein the temporary-identifier allocation completion request message includes the temporary identifier allocated by the source subnet.

9. The method according to claim 1, wherein the new temporary identifier includes a subnet code of the destination subnet.

10. The method according to claim 1, wherein the source subnet and the destination subnet exchange the temporary-identifier allocation completion request message and the temporary-identifier completion response message through an A13 interface.

11. An apparatus for allocating a temporary identifier to an access terminal (AT) in a high-speed data dedicated system, the system including a plurality of subnets and providing ATs within the subnets with service using temporary identifiers, the apparatus comprising:
    a source subnet for receiving a temporary-identifier allocation request message from the AT, allocating the temporary identifier having a subnet code of the source subnet, and transmitting a temporary-identifier allocation response message including the allocated temporary identifier to the AT; and a destination subnet for receiving a temporary-identifier allocation completion message from the AT when the AT moves to the destination subnet while performing an temporary-identifier allocation procedure with the source subnet, transmitting a temporary-identifier allocation completion request message to the source subnet, allocating a new temporary identifier for the AT when receiving a temporary-identifier allocation completion response message responding to the temporary-identifier allocation completion request message from the source subnet, and transmitting a temporary-identifier allocation completion acknowledgement message including the new temporary identifier to the AT.

12. The apparatus according to claim 11, wherein the temporary identifier is a Unicast Access Terminal Identifier (UATI) for code division multiple access (CDMA)-2000 1×Evolution Data Only (1×EV-DO) service.

13. The apparatus according to claim 11, wherein the source subnet deletes the temporary identifier of the AT in response to the temporary-identifier allocation completion request message.

14. The apparatus according to claim 11, wherein the AT recognizes that its own terminal has moved to the destination subnet by receiving an overhead message including subnet parameter information from an Access Network Transceiver System (ANTS) of the destination subnet and analyzing the received subnet parameter information.

15. The apparatus according to claim 11, wherein the destination subnet receives the temporary-identifier allocation completion message including the temporary identifier allocated by the source subnet from the AT, compares a subnet code included in the temporary identifier with its own subnet code, and recognizes the AT has moved to the destination subnet.

16. The apparatus according to claim 15, wherein the destination subnet detects the source subnet using the subnet code.

17. The apparatus according to claim 11, wherein the temporary-identifier allocation completion request message includes the temporary identifier allocated by the source subnet.

18. The apparatus according to claim 11, wherein the new temporary identifier includes a subnet code of the destination subnet.

19. The apparatus according to claim 11, wherein the source subnet and the destination subnet exchange the temporary-identifier allocation completion request message and the temporary-identifier completion response message through an A13 interface.

* * * * *